United States Patent
Suguro

(10) Patent No.: US 8,140,396 B2
(45) Date of Patent: Mar. 20, 2012

(54) SAFETY STOCK AMOUNT CALCULATION METHOD, SAFETY STOCK AMOUNT CALCULATION DEVICE, REORDER POINT CALCULATION METHOD, REORDER POINT CALCULATION DEVICE, AND ORDER QUANTITY CALCULATION METHOD

(75) Inventor: Takao Suguro, Yokohama (JP)

(73) Assignee: TSC, Inc., Kanagawa (JP)

( * ) Notice: Subject to any disclaimer, the term of this patent is extended or adjusted under 35 U.S.C. 154(b) by 0 days.

(21) Appl. No.: 13/045,917

(22) Filed: Mar. 11, 2011

(65) Prior Publication Data

US 2011/0161196 A1 Jun. 30, 2011

Related U.S. Application Data

(62) Division of application No. 10/526,545, filed as application No. PCT/JP2003/010245 on Aug. 12, 2003, now Pat. No. 7,933,805.

(30) Foreign Application Priority Data

Sep. 6, 2002 (JP) ................................. 2002-260784
Apr. 9, 2003 (JP) ................................. 2003-105053

(51) Int. Cl.
    G06Q 20/00 (2006.01)
(52) U.S. Cl. .......................................... 705/22; 705/28
(58) Field of Classification Search ..................... 705/22, 705/28, 29
    See application file for complete search history.

(56) References Cited

FOREIGN PATENT DOCUMENTS

| JP | 4-180165 | 6/1992 |
|---|---|---|
| JP | 7-306894 | 11/1995 |
| JP | 9-120424 | 5/1997 |
| JP | 2000-94276 | 4/2000 |

OTHER PUBLICATIONS

International Perliminary Examination Report issued Apr. 14, 2005 in International (PCT) Application No. PCT/JP2003/010245, including Forms PCT/IB/338 and PCT/IPEA/409 (in English).
International Search Report issued Nov. 25, 2003 in International (PCT) Application No. PCT/JP2003/010245 (in English).

*Primary Examiner* — Elaine Gort
(74) *Attorney, Agent, or Firm* — Wenderoth, Lind & Ponack, L.L.P.

(57) ABSTRACT

A safety stock amount calculation method includes calculating a probability Pb that a delivery time for a certain commodity required by a customer is shorter than its lead time L, calculating an average value LL of a difference between the lead time L and the customer's required delivery time when the lead time L exceeds the customer's required delivery time, correcting an inventory adjustment period N by using the average value LL, and calculating a safety stock amount SS by the equations $SS = Pb \times k \times (\sqrt{N \times F}) \times \sigma$, wherein $\sigma$ is a standard deviation of demand for the commodity, N is a corrected inventory adjustment period, Pb is a probability, F is a shipment frequency, and k is a safety coefficient.

25 Claims, 7 Drawing Sheets

FIG. 8

| Customer's required delivery time | | Lead time | | Effective lead time | |
|---|---|---|---|---|---|
| DT | $g_j$ | LT | $h_k$ | $T_i$ | $f_i$ |
| 1 | 0.5 | 3 | 0.7 | 2 | 0.5×0.7=0.35 |
| 1 | 0.5 | 10 | 0.3 | 9 | 0.5×0.3=0.15 |
| 2 | 0.3 | 3 | 0.7 | 1 | 0.3×0.7=0.21 |
| 2 | 0.3 | 10 | 0.3 | 8 | 0.3×0.3=0.09 |
| 3 | 0.2 | 3 | 0.7 | 0 | 0.2×0.7=0.14 |
| 3 | 0.2 | 10 | 0.3 | 7 | 0.2×0.3=0.06 |

$T_i = LT_k - DT_j \quad (LT_k > DT_j)$ $T_i = 0 \quad (LT_k \leqq DT_j)$

FIG. 9

| i | $T_i$ | $f_i$ | $f_i^2 \cdot T_i$ | $f_i$ Cumulative total |
|---|---|---|---|---|
| 1 | 0 | 0.14 | 0 | 0.14 |
| 2 | 1 | 0.21 | 0.0441 | 0.35 |
| 3 | 2 | 0.35 | 0.245 | 0.70 |
| 4 | 7 | 0.06 | 0.0252 | 0.76 |
| 5 | 8 | 0.09 | 0.0648 | 0.85 |
| 6 | 9 | 0.15 | 0.2025 | 1.00 |
| | | Total | 0.5816 | |

SAFETY STOCK AMOUNT CALCULATION METHOD, SAFETY STOCK AMOUNT CALCULATION DEVICE, REORDER POINT CALCULATION METHOD, REORDER POINT CALCULATION DEVICE, AND ORDER QUANTITY CALCULATION METHOD

This application is a Divisional of U.S. application Ser. No. 10/526,545, filed Mar. 3, 2005 now U.S. Pat. No. 7,933,805, which is a national stage application of International Application No. PCT/JP2003/010245, filed Aug. 12, 2003.

BACKGROUND OF THE INVENTION

1. Technical Field

The present invention relates to a safety stock amount calculation method and a safety stock amount calculation device, and more particularly to, a technique effectively applied to a safety stock amount calculation processing in a system in which inventory management is performed based on a projected inventory.

2. Background Art

A method of calculating a safety stock level based on a standard deviation of past shipments, a lead time L, a safety coefficient k or the like has been known. In this method, a safety stock amount SS is calculated by the following $$SS = k\sigma' \quad \text{[Equation 1]}$$
$$(\sigma' = \sqrt{\text{stock adjustment period} \times \text{shipment frequency} \times \text{standard deviation of demand } \sigma})$$

Where, the demand standard deviation $\sigma$ is calculated from daily demand amount and shows variation of the daily demand with respect to an average demand. The fact that collective stochastic phenomena generally approximates to a normal distribution (central limit theorem) is known, and a demand amount is considered to also conform to a normal distribution in most cases. Here, assuming that a daily standard deviation is $\sigma$, a standard deviation per N days is represented as follows due to additivity of variance:

$$\sqrt{N} \times \sigma$$

Therefore, in the [Equation 1], the square root of (inventory adjustment period×shipment frequency) is used.

The safety coefficient k represents the level of a permissible stockout rate and is determined depending on how much uncertainty such as demand fluctuation or prediction error is taken into consideration. The safety coefficient k is set based on a target ratio of service S. For example, a safety coefficient of 1.65 is obtained from a normal distribution table of quantity demanded when a ratio of service is 95% (95% of demand is met; permissible stockout rate 5%).

The inventory adjustment period is the length of a period during which a response to the customer's order must be made with a quantity corresponding to a single order. The inventory adjustment period is the lead time L itself in the case of an inventory management according to an order-point system, whereas in the case of an inventory management according to a periodic ordering system, the inventory adjustment period becomes a period obtained by adding an ordering cycle M to the lead time L. The shipment frequency denotes the number of orders made in the inventory adjustment period. In the case where orders are made three times per ten days, for example, a value of 0.3 or the like is set as the shipment frequency. When the demand standard deviation $\sigma$ is calculated in units of a week or month, the time unit of the lead time L or ordering cycle M is correspondingly changed.

Recently, in companies' core information processing systems, an ERP (Enterprise Resource Planning) package that processes information related to various management tasks including inventory management, such as, accounting management, product management, sales management or personnel management distributed within the company in an integrated manner is gaining acceptance. In the ERP package, task modules such as inventory management are designed with an integrated database having daybook-type features as a central core, wherein each of the task modules independently functions in general. Of the task modules, the inventory management module adopts a so-called "MRP" (Material Requirements Planning). In the MRP, a production plan is drawn up with the attention paid to the required amount and period of materials based on a relationship between parts of the product and lead time, and required items or the like are ordered based on a projected inventory which is a predicted value of projected inventory amount.

In the ERP package described above, inventory management is practiced as follows. That is, calculation methods of the reorder point and constant order quantity are previously defined in the case of an order-point system, and a calculation method of the order quantity is previously defined in the case of a periodic ordering system, and a user side manages a reorder task by appropriately inputting numeric values. The reorder point or order quantity is determined using the aforementioned safety stock amount. In the order-point system, "reorder point=minimum stock=average demand during inventory adjustment period (during lead time L)+safety stock amount" is satisfied. On the other hand, in the case of the periodic ordering system, "order quantity=commodity amount to be used during inventory adjustment period+safety stock amount−current stock amount−current order remaining amount" is satisfied.

However, the safety stock amount calculation method as described above is a method that calculates a safety stock amount obtained in the case where orders are made with reference to the stock amount and reorder point in the time when the orders are being made. Therefore, the above safety stock amount calculation method does not always adapt to a projected inventory-based system. For the above reason, when the calculation values obtained according to the conventional method are used in the system such as the ERP package in which inventory management is carried out based on a projected inventory, the safety stock amount may become too small or too large, with the result that it is difficult to set a proper reorder point or order quantity. On the EPR software, therefore, calculated values obtained according to the conventional method are input as the safety stock amount with the knowledge that accuracy may be decreased, or the values obtained by appropriately correcting calculated values based on the seat-of-the-pants estimate of a person in charge are input as the safety stock amount, failing to bring out system capability. Naturally, it is of high importance to overcome these problems.

An object of the present invention is to provide a safety stock amount calculation method and a safety stock amount calculation device that conform to the system that carries out inventory management based on a projected inventory.

SUMMARY OF THE INVENTION

A safety stock amount calculation method according to the present invention that calculates a safety stock amount SS based on a demand standard deviation σ for a certain commodity, an inventory adjustment period N calculated from a lead time L of the commodity or its components and a safety coefficient k that denotes the level of a ratio of service S for demand, is characterized by comprising the steps of: calculating a probability Pb that a delivery time for the commodity required by a customer is shorter than the lead time L; calculating any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L has exceeded the customer's required delivery time; correcting the inventory adjustment period N to the representative value LL or the value obtained by adding an ordering cycle M for the commodity to the representative value LL; and calculating the safety stock amount SS based on the standard deviation σ, corrected inventory adjustment period N, probability Pb and safety coefficient k.

The calculation method according to the present invention corrects the inventory adjustment period N using the representative value LL as well as calculates the safety stock amount SS using the short delivery time ratio Pb. Therefore, it is possible to set the practical safety stock amount that meets occurrence of the case where a response to the customer's order must be made with the safety stock. Since the safety stock amount calculation method according to the present invention is a calculation method that uses achievement data such as the representative value LL and the short delivery time ratio Pb, it is possible to cope with the case where an order of commodity and the like is made based on a projected inventory, making it possible to adequately set the safety stock amount of commodity and the like in the ERP package or the like.

In the safety stock amount calculation method, the step of calculating the safety stock amount SS may calculate the safety stock amount SS using the following equation:

$$SS = Pb \times k \times \sqrt{N} \times \sigma$$

A safety stock amount calculation method according to the present invention that calculates a safety stock amount SS based on a demand deviation σ for a certain commodity, an inventory adjustment period N calculated from a lead time L of the commodity or its components and a safety coefficient k that denotes the level of a ratio of service S for demand, is characterized by comprising the steps of: calculating the standard deviation σ based on demand data for the commodity to be obtained in the case where the lead time L has exceeded a customer's required delivery time; calculating any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L has exceeded the customer's required delivery time; correcting the inventory adjustment period N to the representative value LL or the value obtained by adding an ordering cycle M for the commodity to the representative value LL; and calculating the safety stock amount SS based on the standard deviation σ, corrected inventory adjustment period N, and safety coefficient k.

In the safety stock amount calculation method, the step of correcting the inventory adjustment period N may correct the inventory adjustment period N using the representative value LL in place of the lead time L under a fixed order quantity system, and may correct the inventory adjustment period N using the value obtained by adding an ordering cycle M to the representative value LL in place of the lead time L under a periodic ordering system.

Further, in the safety stock amount calculation method, the corrected inventory adjustment period N may be multiplied by a shipment frequency F. Furthermore, the representative value LL may be an average of the difference between the lead time L and customer's required delivery time. In addition, the calculation method may be applied to a system that performs inventory management based on a projected inventory which is the prediction value of a projected inventory amount. The term "inventory management" used here is a concept including product management involving a commodity procurement activity.

A safety stock amount calculation device according to the present invention that calculates a safety stock amount SS based on a past demand deviation σ for a certain commodity, an inventory adjustment period N calculated from a lead time L of the commodity or its components and a safety coefficient k that denotes the level of a ratio of service S for demand, is characterized by comprising: a short delivery time ratio calculation section that calculates a probability Pb that a delivery time for the commodity required by a customer is shorter than the lead time L; an average number of days exceeding delivery time calculation section that calculates any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L exceeds the customer's required delivery time; an inventory adjustment period correction section that corrects the inventory adjustment period N to the representative value LL or the value obtained by adding an ordering cycle M for the commodity to the representative value LL; and a safety stock amount calculation section that calculates the safety stock amount SS based on the standard deviation σ, corrected inventory adjustment period N, short delivery time ratio Pb and safety coefficient k.

A safety stock amount calculation device according to the present invention allows an inventory adjustment period correction section to correct an inventory adjustment period N using the representative value LL as well as allows a short delivery time ratio calculation section to calculate a short delivery time ratio Pb to thereby calculate a safety stock amount SS. Thus, it is possible to set the practical safety stock amount that meets occurrence of the case where a response to the customer's order must be made with the safety stock. Further, since the safety stock amount calculation device according to the present invention calculates the safety stock amount using achievement data of the representative value LL and the short delivery time ratio Pb, it is possible to cope with the case where an order of commodity and the like is made based on a projected inventory, making it possible to adequately set the safety stock amount of commodity and the like in the ERP package or the like.

A safety stock amount calculation device according to the present invention that calculates a safety stock amount SS based on a past demand deviation σ for a certain commodity, an inventory adjustment period N calculated from a lead time L of the commodity or its components and a safety coefficient k that denotes the level of a ratio of service S for demand, is characterized by comprising: a demand standard deviation calculation section that calculates the standard deviation σ based on demand data for the commodity to be obtained in the case where the lead time L has exceeded a customer's required delivery time; an average number of days exceeding delivery time calculation section that calculates any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L exceeds the customer's required delivery time; an inventory adjustment period correction section that corrects the inventory adjustment period N to the representative value LL or the value obtained by adding an ordering cycle M for the commodity to the representative value LL; and a safety stock amount calculation section that calculates the safety stock amount SS based on the standard deviation σ, corrected inventory adjustment period N, and safety coefficient k.

The safety stock amount calculation device may further include a means for inputting the lead time L and ratio of service S and a means for displaying the safety stock amount SS. Note that the representative value LL may be an average of the difference between the lead time L and customer's required delivery time. Further, the safety stock amount calculation device may further include a reorder point calculation section that calculates a reorder point O by adding a value obtained by multiplying a demand average A and the representative value LL to the safety stock amount SS. Further, the safety stock amount calculation device may further include an order quantity calculation section that adds an amount of the commodity or its components to be used in the period obtained by adding the representative value LL and an ordering cycle M to the safety stock amount SS and subtracts, from the obtained value, a current stock amount and current order remaining amount to calculate an order quantity O'.

A safety stock amount calculation program according to the present invention allows, in order to calculate a safety stock amount SS, a computer to function as: a means for calculating a commodity demand standard deviation σ related to demand for a certain commodity; a means for calculating a probability Pb that a delivery time for the commodity required by a customer is shorter than the lead time L of the commodity or its components; a means for calculating any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L exceeds the customer's required delivery time; a means for correcting an inventory adjustment period N to the representative value LL or the value obtained by adding an ordering cycle M of the commodity to the representative value LL; and a means for calculating the safety stock amount SS based on the standard deviation σ, corrected inventory adjustment period N, probability Pb and a safety coefficient k that denotes the level of a ratio of service S for demand.

A safety stock amount calculation program according to the present invention allows, in order to calculate a safety stock amount SS, a computer to function as: a means for calculating a commodity demand deviation σ related to demand for a certain commodity based on data to be obtained in the case where the lead time L of the commodity or its components has exceeded the customer's required delivery time; a means for calculating any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L exceeds the customer's required delivery time; a means for correcting an inventory adjustment period N to the representative value LL or the value obtained by adding an ordering cycle M of the commodity to the representative value LL; and a means for calculating the safety stock amount SS based on the standard deviation σ, corrected inventory adjustment period N, and a safety coefficient k that denotes the level of a ratio of service S for demand.

On the other hand, a reorder point calculation method according to the present invention is characterized by comprising calculating a reorder point O by adding a value obtained by multiplying a demand average A and the representative value LL to a safety stock amount SS calculated by the aforementioned safety stock amount calculation method. Further, a order quantity calculation method according to the present invention is characterized by comprising adding an amount of the commodity or its components to be used in the period obtained by adding the representative value LL and an ordering cycle M to the safety stock amount SS calculated by the aforementioned safety stock amount calculation method and subtracting, from the obtained value, a current stock amount and current order remaining amount to calculate an order quantity O'.

Next, a safety stock amount calculation method according to the present invention is characterized by comprising the steps of: calculating an appearance probability of a certain delivery time for each delivery time based on the delivery time for a certain commodity required by a customer and its frequency; calculating an appearance probability of a lead time of the commodity or its components; calculating, based on the customer's required delivery time and lead time, an effective lead time $T_i$ that denotes the period between the time when it has been predicted that the commodity stock will fall below a corresponding reorder point and the time when the commodity has become available after the commodity had been ordered based on the prediction that the commodity stock would fall below a corresponding reorder point; calculating an appearance probability of the effective lead time $T_i$ for each effective lead time $T_i$ based on the appearance probability of the customer's required delivery time and the appearance probability of the lead time; and calculating a safety stock amount ss based on a demand standard deviation $\sigma_D$ for the commodity per unit of period, a safety coefficient k that denotes the level of a ratio of service S for demand, the effective lead time $T_i$ and the appearance probability of the effective lead time.

A safety stock amount calculation method according to the present invention is characterized by comprising the steps of: calculating an appearance probability of a certain delivery time for each delivery time based on the delivery time for a certain commodity required by a customer and its frequency to create a probability distribution $g_j$ of the customer's required delivery time; calculating an appearance probability of a lead time of the commodity or its components to create a probability distribution $h_k$ of the lead time; calculating, based on the customer's required delivery time and lead time, an effective lead time $T_i$ that denotes the period between the time when it has been predicted that the commodity stock will fall below a corresponding reorder point and the time when the commodity has become available after the commodity had been ordered based on the prediction that the commodity stock would fall below a corresponding reorder point; calculating an appearance probability of the effective lead time $T_i$ for each effective lead time $T_i$ based on the probability distribution $g_j$ of the customer's required delivery time and the probability distribution $h_k$ of the lead time to create a probability distribution $f_i$ of the effective lead time; and calculating a safety stock amount ss based on a demand standard deviation $\sigma_D$ for a certain commodity per unit of period, a safety coefficient k that denotes the level of a ratio of service S for demand, the effective lead time $T_i$ and the probability distribution $f_i$ of the effective lead time.

The safety stock amount calculation method according to the present invention calculates the appearance probability related to the customer's required delivery time and the lead time as well as calculates the appearance probability of the effective lead time using the above calculated values and finally calculates the safety stock amount based on the effective lead time and the appearance probability thereof. As a result, it is possible to design a more general inventory management system being based on a projected inventory. Further, the safety stock amount calculation method of the present invention is a calculation method that uses achievement data, it is possible to cope with the case where an order of commodity and the like is made based on a projected inventory, making it possible to adequately set the safety stock amount of commodity and the like in the ERP package or the like.

In the safety stock amount calculation method, the step of calculating the safety stock amount ss may calculates the safety stock amount ss using the following equation:

$$ss = k\sqrt{\Sigma f_i^2 T_i} \sigma_D$$

In the aforementioned safety stock amount calculation method, the step of calculating the safety stock amount ss may use a demand frequency $F_D$ that denotes an appearance probability of the period during which demand per unit of period is not 0. Further, in the aforementioned safety stock amount calculation method, at least one of the probability distribution of $g_j$ of the customer's required delivery time and the probability distribution $h_k$ of the lead time may be a discrete probability distribution.

Another safety stock amount calculation device according to the present invention is characterized by comprising: a delivery time appearance probability calculation section that calculates an appearance probability of a certain delivery time for each delivery time based on the delivery time for a certain commodity required by a customer and its frequency; a lead time appearance probability calculation section that calculates an appearance probability of a lead time of the commodity or its components; an effective lead time calculation section that calculates, based on the customer's required delivery time and lead time, an effective lead time $T_i$ that denotes the period between the time when it has been predicted that the commodity stock will fall below a corresponding reorder point and the time when the commodity has become available after the commodity had been ordered based on the prediction that the commodity stock would fall below a corresponding reorder point; an effective lead time appearance probability calculation section that calculates an appearance probability of the effective lead time $T_i$ for each lead time $T_i$ based on the appearance probability of the customer's required delivery time and the appearance probability of the lead time; and a safety stock amount calculation section that calculates a safety stock amount ss based on a demand standard deviation $\sigma_D$ for a certain commodity per unit of period, a safety coefficient k that denotes the level of a ratio of service S for demand, the effective lead time $T_i$ and the appearance probability of the effective lead time.

Another safety stock amount calculation device according to the present invention is characterized by comprising: a probability distribution of customer's required delivery time calculation section that calculates an appearance probability of a certain delivery time for each delivery time based on the delivery time for a certain commodity required by a customer and its frequency to create a probability distribution $g_j$ of the customer's required delivery time; a lead time probability distribution calculation section that calculates an appearance probability of a lead time of the commodity or its components to create a probability distribution $h_k$ of the lead time; an effective lead time calculation section that calculates, based on the customer's required delivery time and lead time, an effective lead time $T_i$ that denotes the period between the time when it has been predicted that the commodity stock will fall below a corresponding reorder point and the time when the commodity has become available after the commodity had been ordered based on the prediction that the commodity stock would fall below a corresponding reorder point; an effective lead time probability distribution calculation section that calculates an appearance probability of the effective lead time $T_i$ for each lead time Ti based on the probability distribution $g_j$ of the customer's required delivery time and the probability distribution $h_k$ of the lead time to create a probability distribution $f_i$ of the effective lead time; and a safety stock amount calculation section that calculates a safety stock amount ss based on a demand standard deviation $\sigma_D$ for a certain commodity per unit of period, a safety coefficient k that denotes the level of a ratio of service S for demand, the effective lead time $T_i$ and the probability distribution $f_i$ of the effective lead time.

The safety stock amount calculation device according to the present invention calculates the appearance probability related to the customer's required delivery time and the lead time as well as calculates the appearance probability of the effective lead time using the above calculated values and finally calculates the safety stock amount based on the effective lead time and the appearance probability thereof. As a result, it is possible to design a more general inventory management system being based on a projected inventory. Since the method of the present invention is a calculation method that uses achievement data, it is possible to cope with the case where an order of commodity and the like is made based on a projected inventory, making it possible to adequately set the safety stock amount of commodity and the like in the ERP package or the like.

A safety stock amount calculation program according to the present invention allows, in order to calculate a safety stock amount ss of a certain commodity, a computer to function as: a means for calculating, based on a customer's required delivery time and a lead time of the commodity or its components, an effective lead time $T_i$ that denotes the period between the time when it has been predicted that the commodity stock will fall below a corresponding reorder point and the time when the commodity has become available after the commodity had been ordered based on the prediction that the commodity stock would fall below a corresponding reorder point; a means for calculating an appearance probability of the effective lead time $T_i$ for each lead time $T_i$ based on an appearance probability of the customer's required delivery time calculated from the customer's required delivery time and its frequency and an appearance probability of the lead time of the commodity or its components; and a means for calculating a safety stock amount ss based on a demand standard deviation $\sigma_D$ for the commodity per unit of period, a safety coefficient k that denotes the level of a ratio of service S for demand, the effective lead time $T_i$ and the appearance probability of the effective lead time.

Another safety stock amount calculation program according to the present invention allows, in order to calculate a safety stock amount ss of a certain commodity, a computer to function as: a means for calculating an appearance probability of a certain delivery time for each delivery time based on the delivery time for a certain commodity required by a customer and its frequency to create a probability distribution $g_j$ of the customer's required delivery time; a means for calculating an appearance probability of a lead time of the commodity or its components to create a probability distribution $h_k$ of the lead time; a means for calculating, based on the customer's required delivery time and lead time, an effective lead time $T_i$ that denotes the period between the time when it has been predicted that the commodity stock will fall below a corresponding reorder point and the time when the commodity has become available after the commodity had been ordered based on the prediction that the commodity stock would fall below a corresponding reorder point; a means for calculating an appearance probability of the effective lead time $T_i$ for each lead time $T_i$ based on the probability distribution $g_j$ of the customer's required delivery time and the probability distribution $h_k$ of the lead time to create a probability distribution $f_i$ of the effective lead time; and a means for calculating a safety stock amount ss based on a demand standard deviation $\sigma_D$ for the commodity per unit of period, a safety coefficient k that denotes the level of a ratio of service S for demand, the effective lead time $T_i$ and the probability distribution $f_i$ of the effective lead time.

A reorder point calculation method according to the present invention is characterized by comprising calculating a reorder point $Q_{RO}$ based on a safety stock amount ss calculated by the aforementioned safety stock amount calculation method, a representative value DA from which elected any of an average value, median, mode and experimental value of a demand per unit of period, and a marginal lead time $L_M$ that denotes a minimum value of the effective lead time to be obtained after the cumulative value of the appearance probability of the effective lead time $T_i$ has exceeded the ratio of service S. In this case, the reorder point $Q_{RO}$ may be calculated by further using a demand frequency $F_D$ that denotes an appearance probability of the period during which demand per unit of period is not 0 in addition to the safety stock amount ss, representative value DA of a demand, and marginal lead time $L_M$.

Another reorder point calculation device according to the present invention is characterized by comprising: a delivery time appearance probability calculation section that calculates an appearance probability of a certain delivery time for each delivery time based on the delivery time for a certain commodity required by a customer and its frequency; a lead time appearance probability calculation section that calculates an appearance probability of a lead time of the commodity or its components; an effective lead time calculation section that calculates, based on the customer's required delivery time and lead time, an effective lead time $T_i$ that denotes the period between the time when it has been predicted that the commodity stock will fall below a corresponding reorder point and the time when the commodity has become available after the commodity had been ordered based on the prediction that the commodity stock would fall below a corresponding reorder point; an effective lead time appearance probability calculation section that calculates an appearance probability of the effective lead time $T_i$ for each lead time $T_i$ based on the appearance probability of the customer's required delivery time and the appearance probability of the lead time; a safety stock amount calculation section that calculates a safety stock amount ss based on a demand standard deviation $\sigma_D$ for the commodity per unit of period, a safety coefficient k that denotes the level of a ratio of service S for demand, the effective lead time $T_i$ and the appearance probability of the effective lead time; and a reorder point calculation section that calculates a reorder point $Q_{RO}$ based on the safety stock amount ss, a representative value DA from which elected any of an average value, median, mode, and experimental value of a demand per unit of period, and a marginal lead time $L_M$ that denotes a minimum value of the effective lead time to be obtained after the cumulative value of the appearance probability of the effective lead time $T_i$ has exceeded the ratio of service S.

Another reorder point calculation device according to the present invention is characterized by comprising: a probability distribution of customer's required delivery time calculation section that calculates an appearance probability of a certain delivery time for each delivery time based on the delivery time for a certain commodity required by a customer and its frequency to create a probability distribution $g_j$ of the customer's required delivery time; a lead time probability distribution calculation section that calculates an appearance probability of a lead time of the commodity or its components to create a probability distribution $h_k$ of the lead time; an effective lead time calculation section that calculates, based on the customer's required delivery time and lead time, an effective lead time $T_i$ that denotes the period between the time when it has been predicted that the commodity stock will fall below a corresponding reorder point and the time when the commodity has become available after the commodity had been ordered based on the prediction that the commodity stock would fall below a corresponding reorder point; an effective lead time probability distribution calculation section that calculates an appearance probability of the effective lead time $T_i$ for each lead time Ti based on the probability distribution $g_j$ of the customer's required delivery time and the probability distribution $h_k$ of the lead time to create a probability distribution $f_i$ of the effective lead time; a safety stock amount calculation section that calculates a safety stock amount ss based on a demand standard deviation $\sigma_D$ for a certain commodity per unit of period, a safety coefficient k that denotes the level of a ratio of service S for demand, the effective lead time $T_i$ and the probability distribution $f_i$ of the effective lead time; and a reorder point calculation section that calculates a reorder point $Q_{RO}$ based on the safety stock amount ss, a representative value DA from which elected any of an average value, median, mode and experimental value of a demand per unit of period, and a marginal lead time $L_M$ that denotes a minimum value of the effective lead time to be obtained after the cumulative value of the appearance probability of the effective lead time $T_i$ has exceeded the ratio of service S.

In the reorder point calculation device, the reorder point calculation section may calculate the reorder point $Q_{RO}$ by further using a demand frequency $F_D$ that denotes an appearance probability of the period during which demand per unit of period is not 0 in addition to the safety stock amount ss, representative value DA of a demand, and marginal lead time $L_M$.

BRIEF DESCRIPTION OF DRAWINGS

FIG. 8 is a table showing calculation results of an effective lead time $T_i$ in the case of FIGS. 6 and 7; and FIG. 9 is a table showing results of various calculations using a discrete probability distribution $f_i$ of the effective lead time $T_i$ obtained in FIG. 8.

DETAILED DESCRIPTION OF THE INVENTION

First Embodiment

Figure 1:
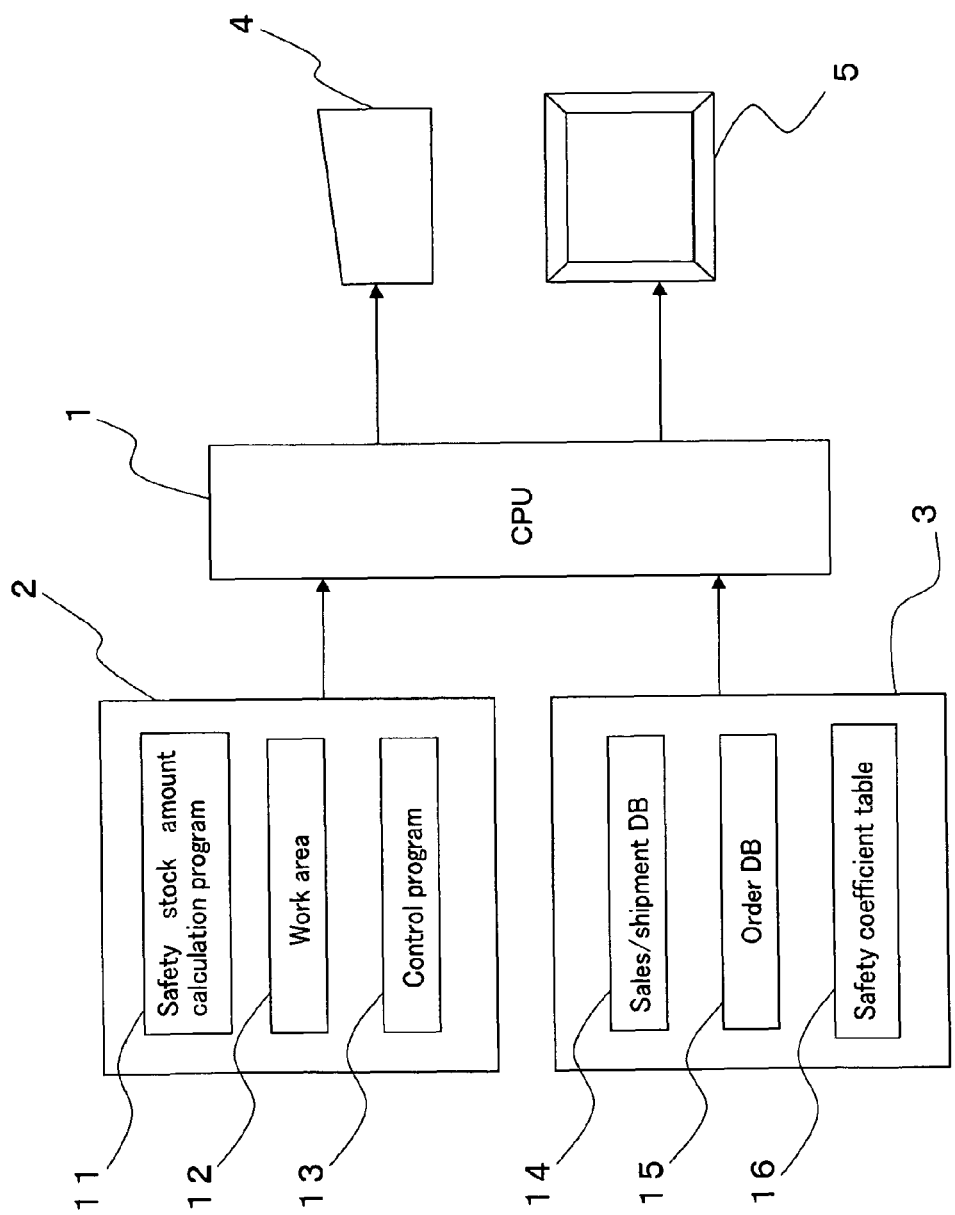
FIG. 1 is a system configuration diagram of a safety stock amount calculation device according to a first embodiment of the present invention.
Figure 2:
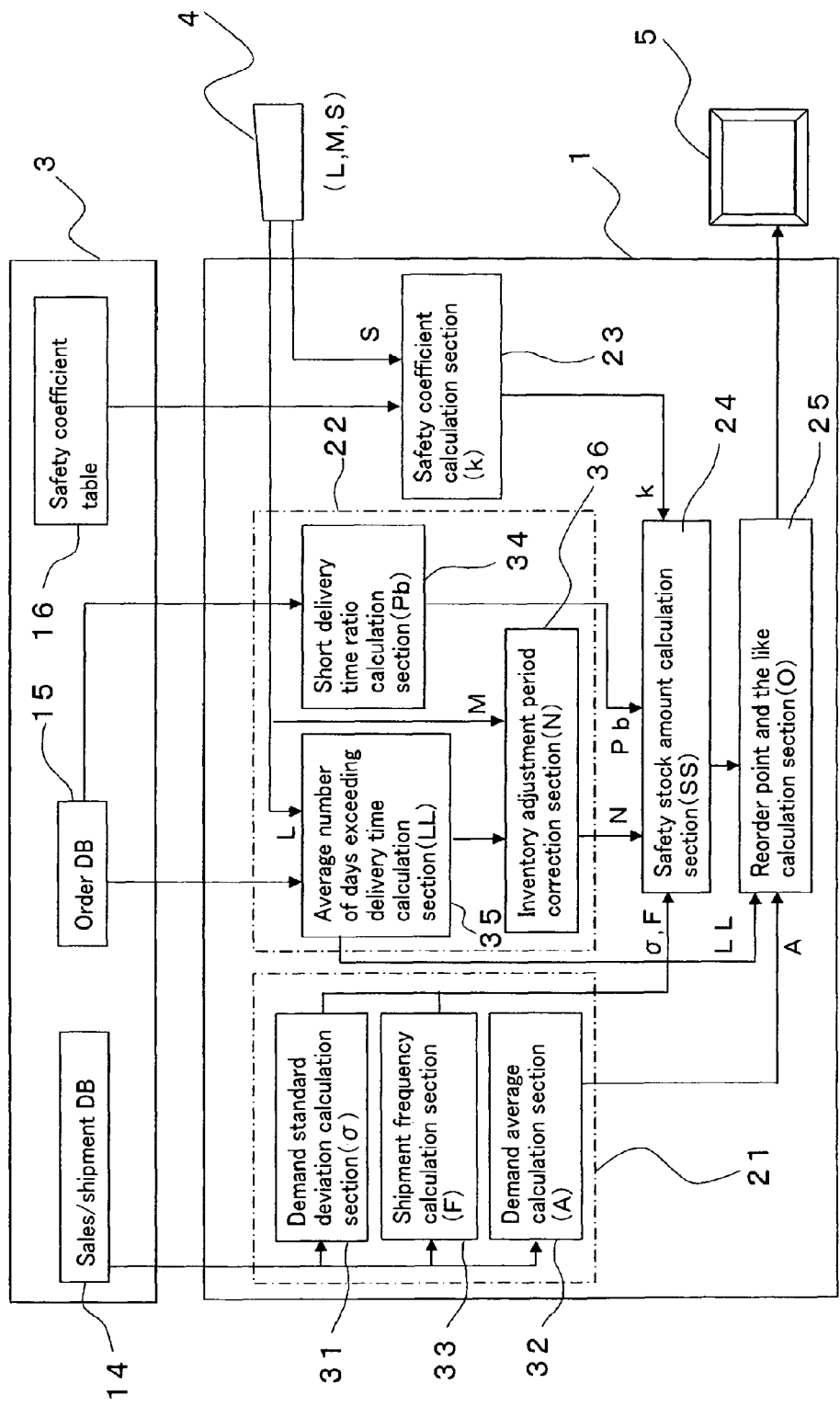
FIG. 2 is a control block diagram in the calculation device of FIG. 1.
Figure 3:
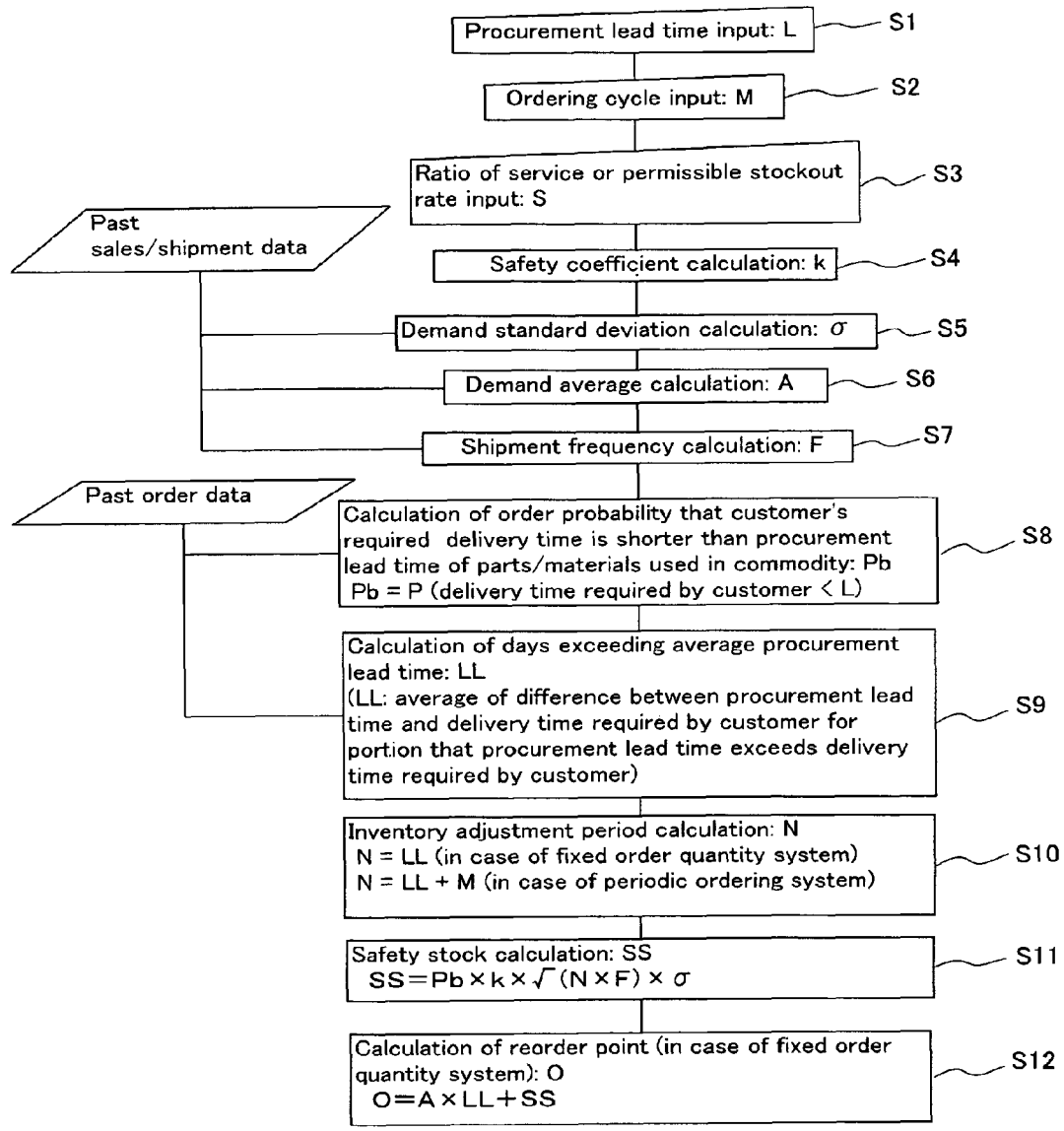
FIG. 3 is a flowchart showing a procedure of a safety stock amount calculation method performed in the calculation device of FIG. 1.

Embodiments of the present invention will be described below in detail with reference to the accompanying drawings. FIG. 1 is a system configuration diagram of a safety stock amount calculation device according to a first embodiment of the present invention. FIG. 2 is a control block diagram in the calculation device of FIG. 1. FIG. 3 is a flowchart showing a procedure of a safety stock amount calculation method performed in the calculation device of FIG. 1.

As shown in FIG. 1, the calculation device includes a CPU 1, a memory 2, a storage unit 3, an input unit (input means) 4, and an output unit (output means) 5, which are connected to each other via a bus 6. The memory 2 stores a safety stock amount calculation program 11, a work area 12, and a control program 13. The safety stock amount calculation program 11, which is executed by the CPU 1, calculates a safety stock amount according to the procedure shown in FIG. 3. The safety stock amount calculation program 11 is an "add-on" program that exists in an ERP package as an underlying program or external program, stored in a computer-readable recording medium, and executed after being read into the memory 2 via a driving unit. The safety stock amount calculation program 11 can be used independently from the ERP package.

The work area 12 is a work area that stores an intermediate result of a process based on the safety stock amount calculation program 11. The control program 13 is a program that controls the entire system. That is, the control program 13 controls the storage unit 3, input unit 4, and output unit 5 in an integrated manner to execute the safety stock amount calculation program 11.

The storage unit 3 stores a sales/shipment database (hereinafter, "database" is abbreviated as "DB") 14, an order DB 15, and a safety coefficient table 16. The sales/shipment DB 14 stores a past sales/shipment record related to a certain commodity (products/articles) or components thereof (parts/materials) (hereinafter, referred to as "commodity and the like"). The order DB 15 stores a past order record of commodity and the like. The safety coefficient table 16 stores data or function indicating a correlation between a ratio of service S and safety coefficient k.

The input unit 4 is a keyboard, mouse, or the like that serves as a unit for inputting various data and instructions for the CPU 1. The output unit 5 is a display or printer that serves as a unit for displaying calculated safety stock amount, reorder point, order quantity or the like. Note that the calculation device may be embodied by a personal computer and its peripherals.

The CPU 1 has a function means as shown in FIG. 2. More specifically, the CPU 1 roughly includes a basic data computation section 21, a correction data computation section 22, a safety coefficient calculation section 23, a safety stock amount calculation section 24, and a reorder point and the like calculation section 25. Input to the CPU 1 via the input unit 4, are a lead time L, an ordering cycle M, a ratio of service (or permissible stockout rate) S or the like. Note that various patterns of the lead time L can be adopted depending on the property of commodity and the like. That is, the lead time L includes not only a procurement lead time indicating a period from order to receipt of a commodity and the like but also a period obtained by adding a manufacturing/assembly lead time indicating a parts manufacturing/assembly period to the procurement lead time, and the above period further including transportation time, inspection time and the like.

The basic data computation section 21 calculates a demand standard deviation σ, a demand average A, a shipment frequency F based on data of the sales/shipment DB 14. The demand standard deviation σ, demand average A, and shipment frequency F are calculated in a demand standard deviation calculation section 31, a demand average calculation section 32, and shipment frequency calculation section 33, respectively. As the standard deviation σ, an approximate value obtained by multiplying a difference between maximum and minimum values of data by a predetermined coefficient ($1/d^2$), which is determined by the number of samples, may be used.

The correction data computation section 22 calculates correction data that has been not used in a conventional safety coefficient calculation method based on input data and data of the order DB 15. That is, a probability Pb that the customer's required delivery time is shorter than the lead time L of the parts/materials used in the commodity (hereinafter, abbreviated as "short delivery time ratio" (make to stock ratio)) is calculated in a short delivery time ratio calculation section 34. Further, the average number of days exceeding the lead time, which is an average of the difference between the lead time L and the customer's required delivery time for the portion that the lead time L exceeds the delivery time required by the customer (hereinafter abbreviated as average number of days exceeding delivery time), is calculated as a representative value LL in an average number of days exceeding delivery time calculation section 35.

Further, an inventory adjustment period N is calculated in an inventory adjustment period correction section 36. In a conventional calculation method, the inventory adjustment period N is, as described above, the lead time L itself in the case where the order-point system is used, and becomes a period obtained by adding an ordering cycle M to the lead time L in the case where the periodic ordering system is used. On the other hand, in the method according to the present invention, the inventory adjustment period N is corrected by the previously calculated average number of days exceeding delivery time LL, and the obtained value is used as N. That is, as the inventory adjustment period N, the average number of days exceeding delivery time LL (N=LL) is used under the fixed order quantity system, and the value (N=LL+M) obtained by adding the ordering cycle M to the average number of days exceeding delivery time LL is used under the periodic ordering system.

The safety coefficient calculation section 23 calculates a safety coefficient k from the safety coefficient table 16 with reference to the ratio of service S input via the input unit 4. As described above, when a ratio of service S of 95% is input, the safety coefficient calculation section 23 calculates k=1.67 based on the safety coefficient table 16 created according to a normal distribution table. Note that the present invention is also applicable to the case where a demand amount does not exhibit normal distribution. In this case, distribution function of a demand amount is calculated, and the safety coefficient k that satisfies a desired ratio of service S is calculated based on the calculated distribution function, for example.

The safety stock amount calculation section 24 calculates a safety stock amount SS based on data obtained in the basic data computation section 21 or correction data computation section 22 and the safety coefficient k obtained in the safety coefficient calculation section 23. Here, the safety stock amount SS is calculated by the following equation:

$$SS = Pb \times k \times \sqrt{N \times F} \times \sigma \quad \text{[Equation 2]}$$

The reorder point and the like calculation section 25 calculates a reorder point or an order quantity based on the safety stock amount SS obtained in the safety stock amount calculation section 24. In the case of the fixed order quantity system, the reorder point and the like calculation section 25 functions as a reorder point calculation section and calculates a reorder point O (O=A×LL+SS). In the case of the periodic ordering system, the reorder point and the like calculation section 25 functions as an order quantity calculation section and calculates an order quantity O' (O'=commodity amount to be used in (LL+ordering cycle M)+SS−current stock amount−current order remaining amount). Note that the current stock amount and current order remaining amount are input through the input unit 4.

In the calculation device having the configuration described above, the safety stock amount SS is calculated along the procedure as described below for obtaining the reorder point O and the like. As shown in FIG. 3, firstly, a lead time L, ordering cycle M, and ratio of service (or permissible stockout rate) S are input in steps S1 to S3. The lead time L is a period from order to receipt of commodity, and e.g. "10 days" or the like is input as the lead time L. The ordering cycle M is order interval set in the periodic ordering system, and e.g. "30 days" or the like is input as the ordering cycle M. As the ratio of services, "95%" or the like is input as described above.

Next, when inputs of these values have been completed, the CPU 1 accesses the safety stock amount calculation program 11 according to the control program 13 and accordingly calculates various fundamental data. In order to calculate the safety stock amount SS, the safety stock amount calculation program 11 allows the CPU (computer) 1 to function as the demand standard deviation calculation section 31, short delivery time ratio calculation section 34, average number of days exceeding delivery time calculation section 35, inventory adjustment period correction section 36, and safety stock amount calculation section 24.

The CPU 1 calculates the safety coefficient k, demand standard deviation σ, demand average A, and shipment frequency F in steps S3 to S7. The calculated values are stored in the work area 12 and used in the following computations.

As described above, the safety coefficient k is calculated by the safety coefficient calculation section 23, which obtains it from the safety coefficient table 16 with reference to the input ratio of service S. The demand standard deviation σ, demand average A, and shipment frequency F are calculated by the basic data computation section 21 based on data of the sales/shipment DB 14. Note that these values (k, σ, A, and F) may be directly input through the input unit 4.

After the fundamental data have been calculated, the CPU 1 calculates various correction data. In step S8, the short delivery time ratio Pb is calculated by the short delivery time ratio calculation section 34. The short delivery time ratio Pb denotes a probability that commodity and the like will not procured in time. For example, in the case where the probability of "a customer's required delivery time<the lead time L" is 30% of the total, according to a past order data, Pb=0.3 is obtained. As to the short delivery time ratio Pb, user's experimental values may be directly input through the input unit 4. For example, when the number of data in the order DB 15 is small like the case in the launch time of the system, it is impossible to correctly calculate the probability, so that a manual input is required. In this case, at the time point when order data has been accumulated to some degree, input mode may appropriately be switched to an automatic calculation. Weighting may be applied to the short delivery time ratio Pb depending on the number of ordered commodities per order. In this case, when 90 commodities are ordered two times as a short delivery time order, and 110 commodities are ordered three times as a short delivery time order with 100 commodities as a reference order number, the Pb is multiplied by 1.08 (=0.9²×1.1³).

The flow advances to step S9, where the average number of days exceeding delivery time LL is calculated by the average number of days exceeding delivery time calculation section 35. The average number of days exceeding delivery time LL denotes the average number of days during which a response to the customer's order must be made with a safety stock and is used for a calculation of the inventory adjustment period N in the following step S10. The average number of days exceeding delivery time LL is also calculated based on data of the order DB 15. As to the average number of days exceeding delivery time LL, user's experimental values may be directly input through the input unit 4.

In step S10, the inventory adjustment period N is calculated in the inventory adjustment period correction section 36. As described above, the calculation equation of the N differs depending on the ordering system. The value of the N may also be input directly through the input unit 4. After the inventory adjustment period N has been calculated, the flow advances to step S11, where the safety stock amount calculation section 24 calculates the safety stock amount SS using the above [Equation 2]. As the demand standard deviation σ, a square root of the average of the square of the difference between each data value and predicted value may be used in place of the method in which a square of the deviation between each data value and average value is obtained and a square root of the average of the obtained values is used as the σ.

The multiplication of the F (shipment frequency) in the above [Equation 2] can be omitted. In order to determine whether the multiplication of the F is applied or not, the calculation method of the demand average A and demand standard deviation σ needs to be changed. That is, as to the data of the day on which no shipment has been made, the calculation of the A or σ is performed on the assumption that the relevant data does not exist, not using "0" as the relevant data, in the case where the shipment frequency F is used. Which is to say, since data handling method differs depending on whether the shipment frequency F is applied or not, the value of the demand average A or demand standard deviation σ mentioned here accordingly differs.

The [Equation 2] differs from the [Equation 1] in the following points: ①In the calculation of N, the average number of days exceeding delivery time LL is used in place of the lead time L. ②Short delivery time ratio Pb is multiplied. Firstly, as to the point ①, the safety stock amount is calculated based on procurement period from the current time period in the conventional method. On the other hand, in the present invention, the safety stock amount is calculated using the average number of days exceeding delivery time LL, that is, an actual compliance period based on the safety stock amount. For example, in the case where the average customer's required delivery time is 7 days and the inventory adjustment period is 10 days, the safety stock amount corresponding to 3 days is actually required on average. Whereas, according to the conventional method, the safety stock amount corresponding to 10 days is required. That is, in the calculation method according to the present invention, it is possible to calculate the safety stock amount more practically than the calculation method simply using the lead time L. In the above example, it is possible to cut out the stock corresponding to 7 days, reducing stock amounts and, thereby, enabling the cost reduction.

As to the point ②, it is possible to determine the safety stock value in consideration of the actual number of the cases where a response to the customer's order must be made with the safety stock by multiplying the value obtained using the N by the Pb, the N having been calculated using the average number of days exceeding delivery time LL. In this case, if there is no case where "customer's required delivery time<lead time L", Pb=0→SS=0, which means that there is no need to have the safety stock. On the other hand, if the state where "customer's required delivery time<lead time L" always continues, the Pb becomes 1.0, which means that there is a need to have enough amount of the safety stock to cope with the average number of days exceeding delivery time LL. Further, if the Pb has a value between the above two cases, that is, Pb=0.3, for example, it is only necessary to have enough amount of the safety stock to cope with the 30%. As a result, it is possible to reduce the safety stock amount by an amount corresponding to the multiplication of Pb (1.0), as compared to the conventional method.

As described above, in the calculation method according to the present invention, it is possible to calculate the safety stock amount more practically by using the average number of days exceeding delivery time LL in place of the lead time L. Further, it is possible to set the safety stock amount that meets occurrence of the case where a response to the customer's order must be made with the safety stock by using the short delivery time ratio Pb. Since this method is a calculation method that uses achievement data of average number of days exceeding delivery time LL and the short delivery time ratio Pb, it is possible to cope with the case where an order of commodity and the like is made based on a projected inventory, making it possible to adequately set the safety stock amount of commodity and the like in the ERP package or the like.

After the safety stock amount SS has been calculated in the manner as described above, the flow advances to step S12, where the reorder point O and order quantity are calculated in the reorder point and the like calculation section 25. At this time, the safety stock amount SS is used in the calculation of the reorder point O and the like. Therefore, more accurate and efficient reorder point and the like can be obtained in the calculation method according to the present invention. The calculated reorder point O and the like are displayed on the output unit 5 together with the safety stock amount SS, and a user makes an order of commodity and the like with reference to the calculated results.

In the above embodiment, the safety stock amount SS is calculated using the short delivery time ratio Pb. Alternatively, however, it is possible to calculate the safety stock amount SS without using the short delivery time ratio Pb, that is, the demand standard deviation σ is calculated based on the demand to be obtained on the assumption that the lead time L exceeds the customer's required delivery time, and the safety stock amount SS is obtained using the calculated σ. In this case, the demand standard deviation σ is calculated using the data (or only the data) obtained on the assumption that the lead time L actually exceeds the customer's required delivery time, which eliminates the need of calculating the short delivery time ratio Pb. That is, it is possible to calculate the safety stock amount SS using the equation obtained by omitting the Pb from the [Equation 2].

In this case, the demand standard deviation calculation section 31 calculates the demand standard deviation σ using only the data obtained on the assumption that the lead time L actually exceeds the customer's required delivery time. Further, the safety stock amount calculation section 24 calculates the safety stock amount SS based on the demand standard deviation σ calculated here, corrected inventory adjustment period N, shipment frequency F, and safety coefficient k.

Second Embodiment

Figure 4:
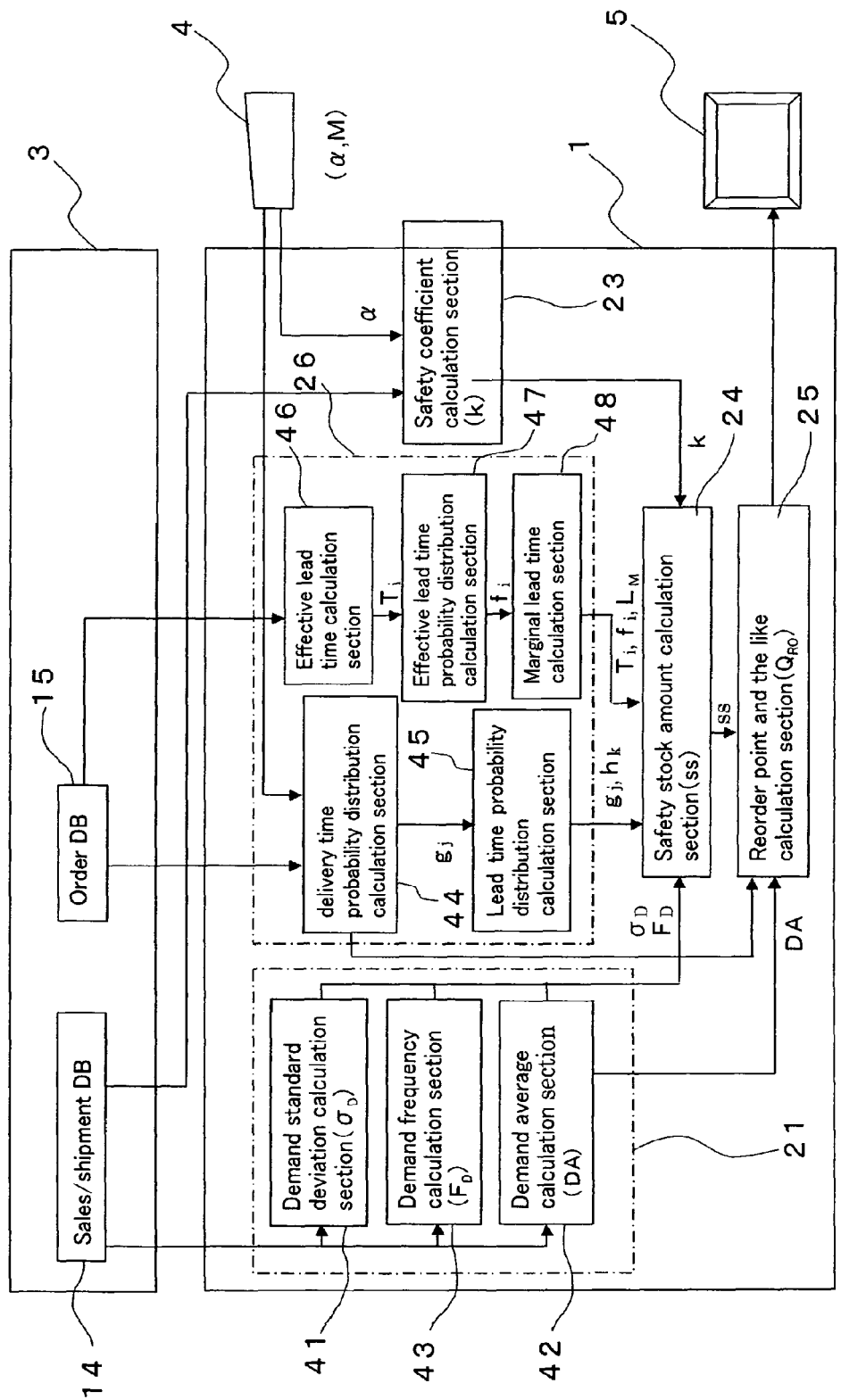
FIG. 4 is a control block diagram of the safety stock amount calculation device according to a second embodiment of the present invention.
Figure 5:
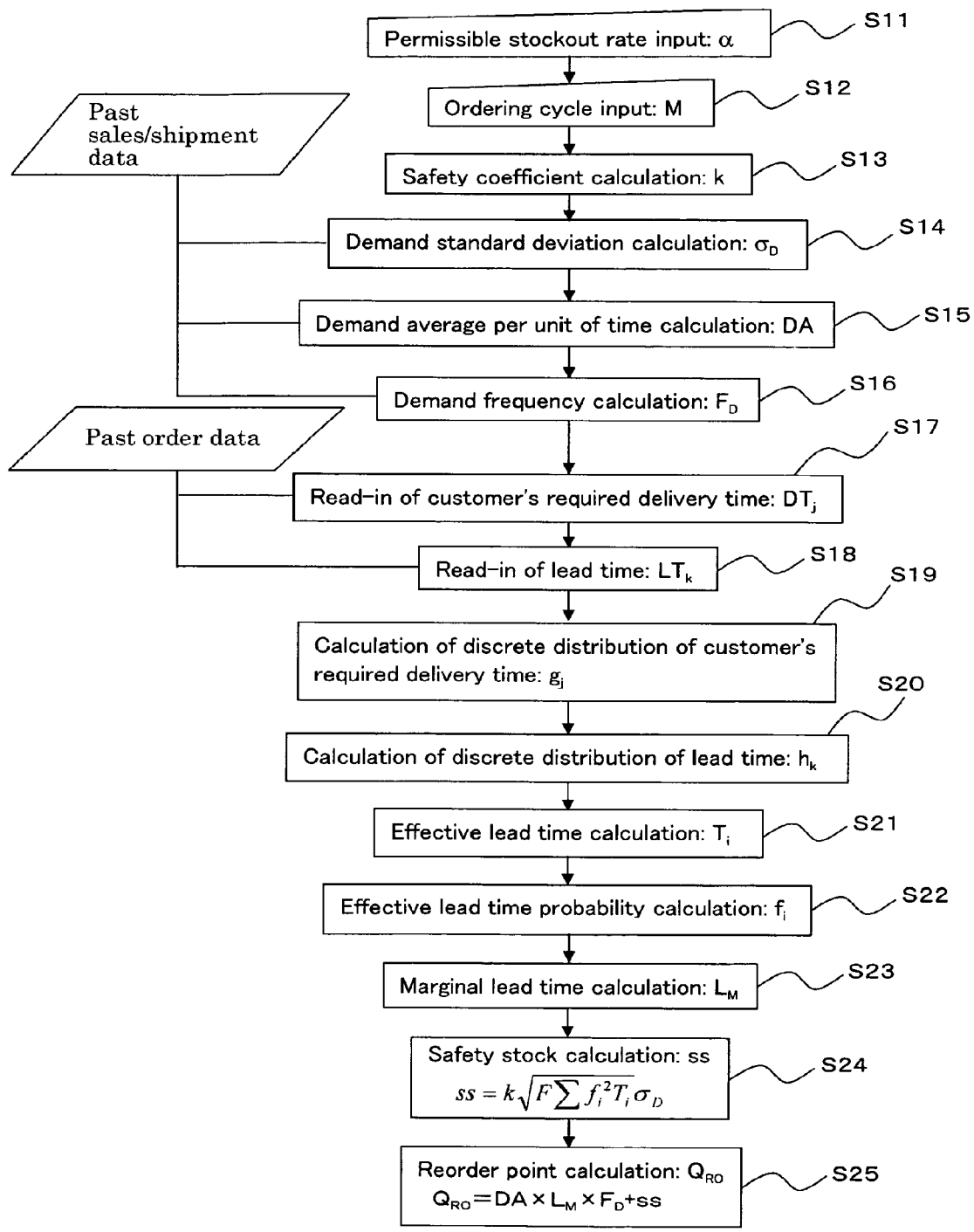
FIG. 5 is a flowchart showing a procedure of a safety stock amount calculation method performed in the calculation device of FIG. 4.

A safety stock amount calculation device according to a second embodiment of the present invention will next be described. FIG. 4 is a control block diagram of the safety stock amount calculation device according to the second embodiment of the present invention; and FIG. 5 is a flow-chart showing a procedure of a safety stock amount calculation method performed in the calculation device of FIG. 4. In this embodiment, the same reference numerals as those in the first embodiment denote the same parts or means as those in the first embodiment, and the descriptions thereof will be omitted here.

The calculation device and calculation method according to the second embodiment have a more general configuration as compared to that of the first embodiment. The first embodiment corresponds to a so-called particular solution that specifies conditions in the second embodiment. As in the case of the first embodiment, the calculation device according to the second embodiment includes the CPU 1, memory 2, storage unit 3, input unit 4, and output unit 5. These components are connected to each other via bus 6. Input to the CPU 1 via the input unit 4, are the permissible stockout rate α (or ratio of service S), ordering cycle M and the like. The CPU 1 has a function means as shown in FIG. 4. More specifically, the CPU 1 roughly includes the basic data computation section 21, a computation data calculation section 26, the safety coefficient calculation section 23, the safety stock amount calculation section 24, and the reorder point and the like calculation section 25.

The basic data calculation section 21 calculates a demand standard deviation per unit of period $\sigma_D$, a demand average (representative value) per unit of period DA, and a demand frequency $F_D$ based on data of the sales/shipment DB 14. The demand standard deviation $\sigma_D$ and demand average DA are calculated respectively in a demand standard deviation calculation section 41 and demand average calculation section 42, where a period such as one day or one month is set as the unit of period.

The demand frequency $F_D$ is an appearance probability of the period during which demand per unit of period is not 0 and is calculated in a demand frequency calculation section 43. The demand frequency $F_D$ is used as a shipment frequency F in terms of the shipment and corresponds to an appearance probability of the day on which the shipment is not 0. The demand frequency $F_D$ is used as a production frequency in terms of the production quantity and corresponds to an appearance probability of the day on which the production quantity is not 0. When the DA or $\sigma_D$ is calculated, it is possible to contain the period during which the demand is 0 with the $F_D$ assumed to be 1.

Figure 6:
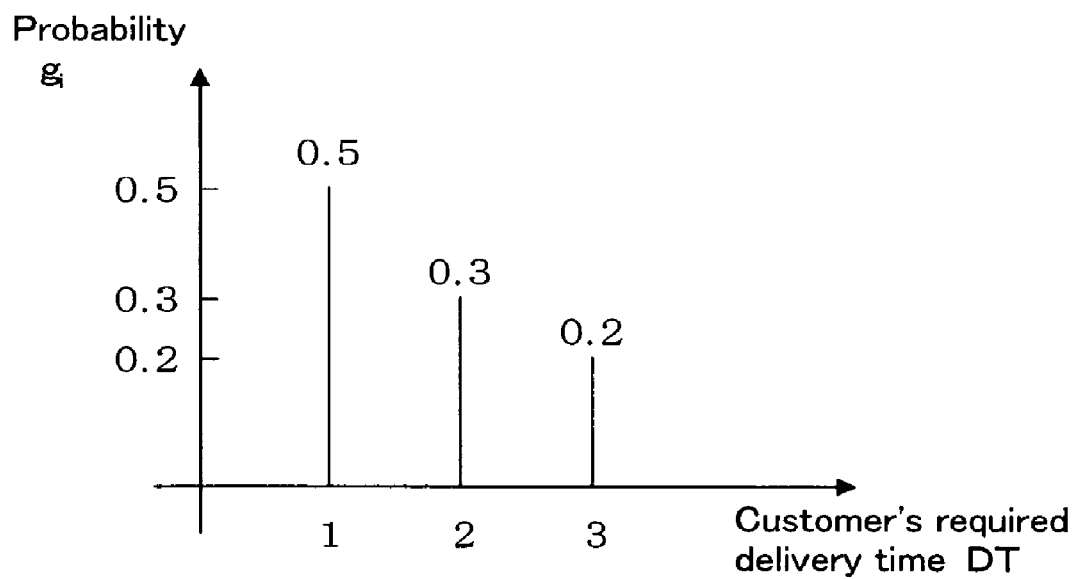
FIG. 6 is an explanatory view showing an example of a discrete probability distribution $g_j$ of a customer's required delivery time.

The computation data calculation section 26 calculates various computation data based on input data or data of the order DB 15. Provided firstly in the computation data calculation section 26 is a delivery time probability distribution calculation section 44 that calculates a discrete probability distribution of a customer's required delivery time. Although the customer's required delivery time includes various periods, such as the very day on which the request has been made, several months away, several years away, it falls within a certain degree of variations in terms of a certain commodity. As a result, an appearance probability of a certain customer's required delivery time can be represented by a discrete probability distribution defined by $g_j$ based on a delivery time of commodity and the like, which is a target of inventory management, required by a customer $DT_j$ and the its required number of times. FIG. 6 is an explanatory view showing an example of the discrete distribution $g_j$ of a customer's required delivery time. As can be seen from FIG. 6, the probability that the customer's required delivery time DT is 1 day is 0.5; the probability that the delivery time DT is 2 days is 0.3, and the probability that the delivery time DT is 3 days is 0.2, in which the total sum of the probability $g_j$ becomes 1.

Further provided in the computation data calculation section 26 is a lead time probability distribution calculation section (lead time appearance probability calculation section) 45 that calculates a discrete probability distribution $h_k$ of a lead time. The lead time denotes a length of the period from which an order of commodity has been made or a production order has been released at the time point when it has been understood that a commodity would be required until the shipment of the commodity or use thereof is enabled after delivery of the commodity or completion of the manufacturing of the commodity. In the case of purchasing a commodity, a procurement lead time corresponds to the above lead time. In the case of manufacturing a commodity, a production lead time corresponds to the above lead time.

Figure 7:
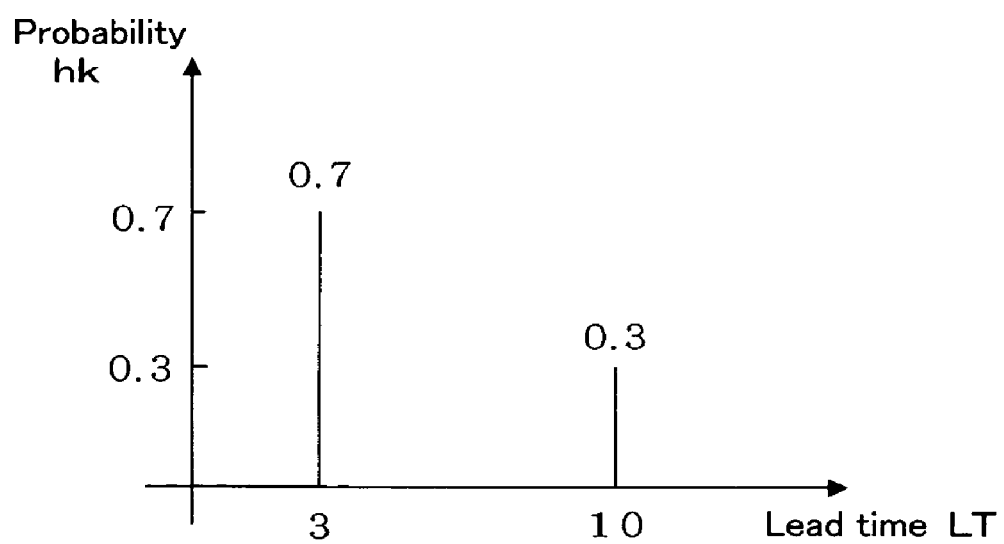
FIG. 7 is an explanatory view showing an example of a discrete probability distribution $h_k$ of a lead time.

Although the lead time also includes various periods, it falls within a certain degree of variations in terms of a certain commodity. As a result, an appearance probability of a certain lead time can be represented by a discrete probability distribution defined by $h_k$ based on appearance frequency of a lead time $LT_k$ of commodity and the like, which is a target of inventory management. FIG. 7 is an explanatory view showing an example of the discrete distribution $h_k$ of the lead time. As can be seen from FIG. 7, the probability that the lead time LT is 3 days is 0.7, and the probability that the lead time LT is 10 days is 0.3, in which the total sum of the probability $h_k$ becomes 1.

The computation data calculation section 26 further includes an effective lead time calculation section 46 in which an effective lead time $T_i$ is calculated from the lead time $LT_k$ and the customer's required delivery time $DT_j$. The effective lead time $T_i$ is a value that denotes the period that has elapsed since an order of commodity has been made or a production order has been released at the time point when it has been predicted that commodity stock will fall below a corresponding reorder point until the shipment of the commodity or use thereof is enabled after delivery of the commodity or completion of the manufacturing of the commodity.

In the case where the lead time $LT_k$ is longer than the customer's required delivery time $DT_j$, the difference between the two is regarded as the effective lead time $T_i$. On the other hand, in the case where the lead time $LT_k$ does not exceed the customer's required delivery time $DT_j$, which denotes a state where the lead time is shorter than the customer's required delivery time and where it is possible to always cope with the customer's required delivery time, the effective lead time $T_i$ becomes 0. That is, when $LT_K > DT_j$, $T_i = LT_k - DT_j$, and when $LT_K \leq DT_j$, $T_i = 0$. In this case, the effective lead time $T_i$ denotes the number of days exceeding delivery time. Note that the average number of days exceeding delivery time LL of the first embodiment is an average of the effective lead time $T_i$.

As described above, the effective lead time $T_i$ is calculated from the $LT_K$ and $DT_j$, and the $LT_K$ and $DT_j$ depend on the discrete distribution $h_k$ and discrete distribution $g_j$.

Accordingly, the effective lead time $T_i$ also depends on the discrete distribution defined by $f_i$. Thus, the computation data calculation section 26 includes an effective lead time probability distribution calculation section 47 that calculates the discrete distribution $f_i$ of the effective lead time $T_i$. The discrete distribution $f_i$ is calculated, for each effective lead time Ti, by multiplying the discrete distribution $g_j$ of the required delivery time and the discrete distribution $h_k$ of the lead time.

FIG. 8 is a table showing calculation results of the effective lead time $T_i$ in the case of FIGS. 6 and 7. The effective lead time $T_i$ assumes six different values depending on the combination of DTs (1 to 3 days) and LTs (3 and 10 days). Then, by multiplying $h_k$ and $g_j$ for each effective lead time $T_i$, the discrete distribution $f_i$ of each effective lead time $T_i$ is obtained. That is, the discrete distribution $f_i$ can be represented by the following equation:

$$f_i = \sum_{j,k \in Si} (g_j \times h_k) \quad \text{[Equation 3]}$$

$$Si = \{j, k \mid T_i = LT_k - DT_j\}$$

As shown in the above equation, the discrete distribution $f_i$ is the total sum of $(g_j \times h_k)$ for each combination of $LT_k$ and $DT_J$ in which $Ti = LT_k - DT_j$. When, for example, there are a plurality of the combinations that make Ti=3, such as "$LT_k=5$, $DT_j=2$", "$LT_k=6$, $DT_j=3$", and "$LT_k=7$, $DT_j=4$", although the example shown in FIG. 8 does not include combinations in which the $T_i$ assumes the same number, the total sum of $(g_j \times h_k)$ for the above three case becomes a value of $f_i$ in the case where $T_i=3$.

Further, the computation data calculation section 26 includes a marginal lead time calculation section 48 that calculates a marginal lead time $L_M$ based on the effective lead time $T_i$ and permissible stockout rate $\alpha$. The marginal lead time $L_M$ is a minimum value of the effective lead time $T_i$ to be obtained after the cumulative value of the appearance probability $f_i$ of the effective lead time $T_i$ has exceeded $1-\alpha$ (=ratio of service S). That is, the marginal lead time $L_M$ can be represented by the following equation:

$$L = \max T_i \text{ where } \sum_{i=1}^{n} f_i < (1 - \alpha) \quad \text{[Equation 4]}$$

The safety coefficient calculation section 23 calculates the safety coefficient k using the permissible stockout rate $\alpha$ that has been input through the input unit 4. While the safety coefficient k is calculated from the ratio of service S and safety coefficient table 16 in the first embodiment, the safety coefficient k is calculated, in a more general manner, using an inverse function v(α) of the cumulative density function of the demand probability distribution in this second embodiment. The safety coefficient calculation section 23 firstly calculates the demand probability distribution based on data of the sales/shipment DB 14 and creates the cumulative density function thereof. The cumulative density function is an integral of the demand probability distribution. The function value corresponding to a certain demand denotes a probability that the demand larger (or smaller) than the certain demand amount appears.

The inverse function of the cumulative density function as above derives the demand from the appearance probability of the demand, and v(α) denotes the demand whose appearance probability is α. Accordingly, when the permissible stockout rate is used as the α, demand in which the permissible stockout rate is α is derived. Further, the safety coefficient calculation section 23 calculates the demand standard deviation $\sigma_0$ based on the sales/shipment data. When the cumulative density function v(α) is divided by the demand standard deviation $\sigma_0$, a value denoting how many times the demand in which the permissible stockout rate is α is as large as the standard deviation $\sigma_0$ is calculated. The calculated value is the safety coefficient k ($k = v(\alpha)/\sigma_0$). Note that the ratio of service S ($S = 1 - \alpha$) may be used in place of the permissible stockout rate α.

The safety stock amount calculation section 24 calculates the safety stock amount ss based on the data calculated in the basic data computation section 21 and computation data calculation section 26 and the safety coefficient k calculated in the safety coefficient calculation section 23. The safety stock amount ss is calculated by the following equation:

$$ss = k\sqrt{F_D \Sigma f_i^2 T_i} \sigma_D \quad \text{[Equation 5]}$$

Assuming that X: demand during procurement period, $x_i$: demand corresponding to effective lead time $T_i$, x: demand during a unit of period, and $\sigma_x$: standard deviation of demand during procurement period, X is represented by [Equation 6], and the variance V(X) of X is represented by [Equation 7].

$$X = \sum_{i=1}^{n} (P(T_i) \times x_i) \quad \text{[Equation 6]}$$

$$V(X) = V\left(\sum_{i=1}^{n} (P(T_i) \times x_i)\right) \quad \text{[Equation 7]}$$

The [Equation 7] can be modified as [Equation 8] due to additivity of variance.

$$V(X) = \sum_{i=1}^{n} [P(T_i)^2 \times V(x_i)] \quad \text{[Equation 8]}$$

The [Equation 8] can be modified as [Equation 9] by the definition of variance $V(x_i)$ of $x_i$. Further, when V(x), which is irrelevant to i, is taken out, the [Equation 9] is represented as [Equation 10].

$$V(X) = \sum_{i=1}^{n} (P(T_i)^2 \times T_i \times V(x)) \quad \text{[Equation 9]}$$

$$= \left[\sum_{i=1}^{n} (P(T_i)^2 \times T_i)\right] \times V(x) \quad \text{[Equation 10]}$$

Accordingly, $\sigma_x$ is represented as follows:

$$\sigma x = \sqrt{V(X)} \quad \text{[Equation 11]}$$

$$= \sqrt{\sum_{i=1}^{n} (P(T_i)^2 \times T_i)} \times \sqrt{V(x)}$$

$$= \sqrt{\sum_{i=1}^{n} (P(T_i)^2 \times T_i)} \times \sigma_D$$

Therefore, when the [Equation 10] is assigned to the safety stock amount $ss = k\sigma_x$ with the demand frequency $F_D$ taken into consideration, the above [Equation 5] can be obtained.

The reorder point and the like calculation section 25 calculates the reorder point or order quantity based on the safety stock amount ss calculated in the safety stock amount calculation section 24. Under the fixed order quantity system, the reorder point and the like calculation section 25 functions as a reorder point calculation section, where a reorder point $Q_{RO}$ is calculated by the following equations:

$$Q_{RO} DA \times L_M \times F_D + ss \quad \text{[Equation 12]}$$

Under the periodic ordering system, the reorder point and the like calculation section 25 functions as an order quantity calculation section, where an order quantity $Q_{RO}'$ is calculated ($Q_{RO}'$ = commodity amount to be used in (LM+ordering cycle M))+SS−current stock amount−current order remaining amount).

In the calculation device having the configuration described above, the safety stock amount ss is calculated along the procedure as described below for obtaining the reorder point O and the like. As shown in FIG. 5, firstly, the permissible stockout rate α (or ratio of service S) and ordering cycle M are input in steps S11 and S12. The ordering cycle M is order interval set in the periodic ordering system, and for example "30 days" or the like is input as the ordering cycle M. Under the fixed order quantity system, the ordering cycle M need not be input. As the permissible stockout rate α, "5%" or the like is input.

When inputs of these values have been completed, the CPU 1 accesses the safety stock amount calculation program 11 according to the control program 13 and accordingly calculates various fundamental data. In order to calculate the safety stock amount ss, the safety stock amount calculation program 11 allows the CPU 1 to function as the delivery time probability distribution calculation section 44, lead time probability distribution calculation section 45, effective lead time calculation section 46, effective lead time probability distribution calculation section 47, and safety stock amount calculation section 24.

The CPU 1 calculates the safety coefficient k, demand standard deviation $\sigma_D$ per unit of period, demand average DA per unit of period, and demand frequency $F_D$ in steps S13 to S16. The calculated values are stored in the work area 12 and used in the following computations.

As described above, the safety coefficient k is calculated by the safety coefficient calculation section 23 based on the cumulative density function v(α) and standard deviation $\sigma_0$ (k=v(α)/$\sigma_0$). Alternatively, the safety coefficient table may be referred to as the first embodiment. The demand standard deviation $\sigma_D$ per unit of period, demand average DA per unit of period, and demand frequency $F_D$ are calculated by the basic data computation section 21 based on data of the sales/shipment DB 14.

After the fundamental data have been calculated, the CPU 1 reads in the customer's required delivery time $DT_j$ and lead time $LT_K$ from the order DB 15 in steps S17 and S18. After that, various computation data are calculated using the above values. Firstly, in step S19, the discrete distribution $g_j$ of the customer's required delivery time shown as an example in FIG. 6 is calculated. Further, in step 20, the discrete distribution $h_k$ of the lead time as shown in FIG. 7 is calculated.

The flow advances to step S21 and the CPU 1 calculates the effective lead time $T_i$ using the discrete distribution $g_j$ of the customer's required delivery time and discrete distribution $h_k$ of the lead time. As described above, when $LT_K > DT_j$, $T_i = LT_K - DT_j$, and whereas when $LT_K \leq DT_j$, $T_i = 0$. After that, the discrete distribution $f_i$ of the effective lead time $T_i$ is calculated based on the discrete distribution $g_j$ of the customer's required delivery time, discrete distribution $h_k$ of the lead time and effective lead time $T_i$ by using [Equation 3] (step S22).

After the effective lead time $T_i$ and discrete distribution $f_i$ thereof have been calculated, the marginal lead time LM is calculated as shown in the [Equation 4] using the discrete distribution $f_i$ and permissible stockout rate α (step S23). The flow advances to step S24 and the safety stock amount calculation section 24 calculates the safety stock amount ss based on the above [equation 5]. FIG. 9 is a table showing calculation results of ($f_i^2 \cdot T_i$) within the square root of the [equation 5] using the discrete distribution $f_i$ of the effective lead time $T_i$ obtained in FIG. 8 and the cumulative value of discrete distribution $f_i$.

As to the marginal lead time LM, assuming, in the example of FIG. 9, that permissible stockout rate α=5%, the minimum effective lead time $T_i$ to be obtained after the cumulative value $f_i$ has exceeded 1−α=0.95 is 9, with the result that the marginal lead time LM=9. As to the safety stock amount ss in this example, assuming that demand frequency $F_D$=0.5, safety coefficient k=1.65, and demand standard deviation $\sigma_D$ per unit of period=30 and these values are assigned to the [Equation 5], ss=1.65×(0.5×0.5816)$^{1/2}$×30=26.693.

After the safety stock amount ss has been calculated as described above, the flow advances to step S25, where the reorder point and the like calculation section 25 calculates the reorder point $Q_{RO}$ or order quantity using the above [Equation 12]. In the case of the above example, assuming that demand average DA per unit of period=100, $Q_{RO}$=100×9×0.5+26.693=476.693. This means that the safety stock amount with a permissible stockout rate α of 5% or less is 26.693, and the reorder point needed to maintain this value in the above-mentioned condition is 476.693. That is, it can be understood from the result that when the stock amount of a certain commodity has fallen below 476, the commodity should be ordered.

Whereas, according to the conventional safety stock amount calculation method (Equation 1: ss=k×σ'), ss=1.65×(0.5×10)$^{1/2}$×30=110.69. That is, the use of the [Equation 5] can reduce the safety stock amount by about ¼. Further, when the reorder point $Q_{RO}$ is calculated according to the conventional calculation method, $Q_{RO}$=10×100+110.69=1110.69. That is, the use of the [Equation 5] can reduce the reorder point by ½ or less.

As described above, the safety stock amount calculation method and device according to the second embodiment calculates the appearance probability related to the customer's required delivery time and the lead time as well as calculates the appearance probability of the effective lead time using the above calculated values and finally calculates the safety stock amount based on the effective lead time and the appearance probability thereof. As a result, it is possible to design a more general inventory management system being based on a projected inventory as compared to the first embodiment.

In the above case, where the discrete distribution $g_j$ of the required delivery time or discrete distribution $h_k$ of the lead time is unknown, the safety stock amount ss may be obtained by the following equation:

$$ss = k\sqrt{L \times F_D} \times \sigma_D \times M \qquad \text{[Equation 13]}$$

In the [Equation 13], L=$_{max}T_i$=$LT_{max}$−$DT_{min}$ (minimum delivery time is subtracted from max lead time) is satisfied. Further, M is a probability that the purchase order that causes a commodity speculative production or procurement of the commodity to be needed is generated because it is impossible to make it for the purchase order in the case where an order of the commodity is made or manufacturing of the commodity is started even immediately after the purchase order. The M corresponds to the short delivery time ratio Pb of the first embodiment, and may be calculated based on the past record or experimental values.

The [Equation 13] corresponds to the case where ($T_1$=L, $f_1$=M), ($T_2$=0, $f_2$=1−M) in the [Equation 5]. This means that the probability that the effective lead time is L is M and otherwise the lead time is shorter than the delivery time (delivery delay does not occur). The equation that uses the average number of days exceeding delivery time LL in place of L=$_{max}T_i$ is the [Equation 2] of the first embodiment. That is, the [Equation 2] and [Equation 13] each corresponds to a particular solution of the [Equation 5].

It goes without saying that the present invention is not limited to the above embodiments, and various changes may be made without departing from the scope of the invention.

For example, each of the values such as Pb described in the above embodiments or each of the examples of the second embodiment shown in FIGS. 6 to 9 is merely one example, and the calculation method and calculation device according to the present invention are not limited to the above. Further, while the method of the present invention is utilized as a part of an ERP package in the above example, the method and device of the present invention can independently be used.

Further, the present invention is applicable to ordering methods other than "periodic ordering system" or "fixed order quantity system". For example, the present invention can be applied to various methods such as an intermediate method between the "periodic ordering system" and "fixed order quantity system" that previously sets the maximum and minimum stock amounts and orders commodity by the difference between the maximum stock amount and the stock amount at the ordering moment at the time point when the stock amount has fallen below the reorder point (minimum stock amount).

Further, as the representative value LL of the difference between the lead time L and customer's required delivery time, the average number of days exceeding delivery time, which is an arithmetic average of the difference between the two, is used in the above embodiments. Alternatively, however, various average values such as geometric average or harmonic average, median, mode, experimental values, or the like of the difference between the lead time L and customer's required delivery time can be used. Similarly, as to the demand average A or DA, other representative values that represent its distribution can be used. That is, as the demand average A or DA, not only arithmetic average, but also geometric average or harmonic average can be used. In addition, median and mode can be used in place of the above average values. Also in this case, experimental values can be used.

Further, the present invention is also applicable to the case where the demand does not exhibit normal distribution. In this case, distribution function of the demand is calculated, and the safety coefficient k that satisfies a desired ratio of service S is calculated based on the calculated distribution function, for example.

Further, while both the appearance probability of the lead time $LT_K$ and the appearance probability of the customer's required delivery time $DT_j$ are represented by discrete distributions in the second embodiment, one of the two may be represented by a continuous distribution. The use of an increased number of days as samples of the lead time $LT_K$ or customer's required delivery time $DT_j$ may result in an enormous number of combinations of the effective lead time $T_i$, increasing calculation load for the discrete distribution $f_i$. In such a case, representative values may appropriately be used to calculate the discrete distribution $f_i$. In this time, a so-called Monte Carlo simulation may be performed by using a random number table or the like.

In the above embodiments, the demand standard deviation (standard deviation of demand amount per unit of period) is used to calculate the safety stock amount and the like. Alternatively, however, it is possible to use, as the standard deviation, not only statistical standard deviation but also a value that indicates the uncertainty of the demand. For example, it is possible to use a square root of the value obtained by diving the square-sum of the prediction error between individual demand and corresponding predicted demand by (n−1) (number of data items−1).

The safety stock amount calculation method according to the present invention that calculates the safety stock amount SS based on the demand standard deviation σ for a certain commodity, the inventory adjustment period N calculated from the lead time L of the commodity or its components, and the safety coefficient k that denotes the level of the ratio of service S for demand, corrects the inventory adjustment period N with the average number of days exceeding delivery time LL as well as calculates the safety stock amount SS using the short delivery time ratio Pb. Therefore, it is possible to set a practical stock amount that meets occurrence of the case where a response to the customer's order must be made with the safety stock. Since this method is a calculation method that uses achievement data of average number of days exceeding delivery time LL and the short delivery time ratio Pb, it is possible to cope with the case where an order of commodity and the like is made based on a projected inventory, making it possible to adequately set the safety stock amount of commodity and the like in the ERP package or the like.

Further, the safety stock amount calculation method according to the present invention calculates the appearance probability related to the customer's required delivery time and the lead time as well as calculates the appearance probability of the effective lead time using the above calculated values and finally calculates the safety stock amount based on the effective lead time and the appearance probability thereof. As a result, it is possible to design a more general inventory management system being based on a projected inventory. Since the method of the present invention is a calculation method that uses achievement data, it is possible to cope with the case where an order of commodity and the like is made based on a projected inventory, making it possible to adequately set the safety stock amount of commodity and the like in the ERP package or the like.

The invention claimed is:

1. A safety stock amount calculation method that calculates a safety stock amount SS based on a demand deviation σ for a certain commodity, an inventory adjustment period N being calculated from a lead time L of the commodity or its components and a safety coefficient k that denotes the level of a ratio of service S for demand, the method comprising:

storing, in a storage unit that includes a non-transitory computer-readable recording medium, a safety stock amount calculation program executable by a processor;

calculating, using the processor, a probability Pb that a delivery time for the commodity required by a customer is shorter than the lead time L;

calculating, using the processor, any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L has exceeded the customer's required delivery time;

correcting, using the processor, the inventory adjustment period N to the representative value LL or the value obtained by adding an ordering cycle M for the commodity to the representative value LL; and calculating, using the processor, the safety stock amount SS based on the standard deviation σ, corrected inventory adjustment period N, probability Pb and safety coefficient k.

2. The safety stock amount calculation method according to claim 1, wherein the step of calculating the safety stock amount SS calculates the safety stock amount SS using the following equation:

$$SS = Pb \times k \times \sqrt{N} \times \sigma.$$

3. The safety stock amount calculation method according to claim 1, wherein the step of correcting the inventory adjustment period N corrects the inventory adjustment period N using the representative value LL in place of the lead time L under a fixed order quantity system, and corrects the inventory adjustment period N using the value obtained by adding an ordering cycle M to the representative value LL in place of the lead time L under a periodic ordering system.

4. The safety stock amount calculation method according to claim 1, wherein the corrected inventory adjustment period N is multiplied by a shipment frequency F.

5. The safety stock amount calculation method according to claim 1, wherein the representative value LL is an average of the difference between the lead time L and customer's required delivery time.

6. The safety stock amount calculation method according to claim 1, wherein the calculation method is applied to a system that performs inventory management based on a projected inventory which is the prediction value of a projected inventory amount.

7. A reorder point calculation method comprising calculating a reorder point O by adding a value obtained by multiplying a demand average A and the representative value LL to a safety stock amount SS calculated by the safety stock amount calculation method as described in claim 1.

8. A order quantity calculation method comprising adding an amount of the commodity or its components to be used in the period obtained by adding the representative value LL and an ordering cycle M to the safety stock amount SS calculated by the safety stock amount calculation method as described in claim 1 and subtracting, from the obtained value, a current stock amount and current order remaining amount to calculate an order quantity O'.

9. A safety stock amount calculation method that calculates a safety stock amount SS based on a demand deviation σ for a certain commodity, an inventory adjustment period N being calculated from a lead time L of the commodity or its components and a safety coefficient k that denotes the level of a ratio of service S for demand, the method comprising:
   storing, in a storage unit that includes a non-transitory computer-readable recording medium, a safety stock amount calculation program executable by a processor;
   calculating, using the processor, the standard deviation σ based on demand data for the commodity to be obtained in the case where the lead time L has exceeded a customer's required delivery time;
   calculating, using the processor, any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L has exceeded the customer's required delivery time;
   correcting, using the processor, the inventory adjustment period N to the representative value LL or the value obtained by adding an ordering cycle M for the commodity to the representative value LL; and
   calculating, using the processor, the safety stock amount SS based on the standard deviation σ, corrected inventory adjustment period N, and safety coefficient k.

10. The safety stock amount calculation method according to claim 9, wherein the step of correcting the inventory adjustment period N corrects the inventory adjustment period N using the representative value LL in place of the lead time L under a fixed order quantity system, and corrects the inventory adjustment period N using the value obtained by adding an ordering cycle M to the representative value LL in place of the lead time L under a periodic ordering system.

11. The safety stock amount calculation method according to claim 9, wherein the corrected inventory adjustment period N is multiplied by a shipment frequency F.

12. The safety stock amount calculation method according to claim 9, wherein the representative value LL is an average of the difference between the lead time L and customer's required delivery time.

13. The safety stock amount calculation method according to claim 9, wherein the calculation method is applied to a system that performs inventory management based on a projected inventory which is the prediction value of a projected inventory amount.

14. A reorder point calculation method comprising calculating a reorder point O by adding a value obtained by multiplying a demand average A and the representative value LL to a safety stock amount SS calculated by the safety stock amount calculation method as described in claim 9.

15. A order quantity calculation method comprising adding an amount of the commodity or its components to be used in the period obtained by adding the representative value LL and an ordering cycle M to the safety stock amount SS calculated by the safety stock amount calculation method as described in claim 9 and subtracting, from the obtained value, a current stock amount and current order remaining amount to calculate an order quantity O'.

16. A safety stock amount calculation device that calculates a safety stock amount SS based on a past demand deviation σ for a certain commodity, an inventory adjustment period N being calculated from a lead time L of the commodity or its components and a safety coefficient k that denotes the level of a ratio of service S for demand, the device comprising:
   a storage unit, the storage unit including a non-transitory computer-readable recording medium storing a safety stock amount calculation program; and
   at least one processor configured to operates as:
   a short delivery time ratio calculation section that calculates a probability Pb that a delivery time for the commodity required by a customer is shorter than the lead time L;
   an average number of days exceeding delivery time calculation section that calculates any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L has exceeded the customer's required delivery time;
   an inventory adjustment period correction section that corrects the inventory adjustment period N to the representative value LL or the value obtained by adding an ordering cycle M for the commodity to the representative value LL; and
   a safety stock amount calculation section that calculates the safety stock amount SS based on the standard deviation σ, corrected inventory adjustment period N, short delivery time ratio Pb and safety coefficient k.

17. The safety stock amount calculation device according to claim 16, further comprising means for inputting the lead time L and ratio of service S and means for displaying the safety stock amount SS.

18. The safety stock amount calculation device according to claim 16, further comprising a reorder point calculation section that calculates a reorder point O by adding a value obtained by multiplying a demand average A and the representative value LL to the safety stock amount SS.

19. The safety stock amount calculation device according to claim 16, further comprising an order quantity calculation section that adds an amount of the commodity or its components to be used in the period obtained by adding the representative value LL and an ordering cycle M to the safety stock amount SS and subtracts, from the obtained value, a current stock amount and current order remaining amount to calculate an order quantity O'.

20. A safety stock amount calculation device that calculates a safety stock amount SS based on a past demand deviation σ for a certain commodity, an inventory adjustment period N being calculated from a lead time L of the commodity or its components and a safety coefficient k that denotes the level of a ratio of service S for demand, the device comprising:
   a storage unit, the storage unit including a non-transitory computer-readable recording medium storing a safety stock amount calculation program; and at least one processor configured to operates as:
- a demand standard deviation calculation section that calculates the standard deviation σ based on demand data for the commodity to be obtained in the case where the lead time L has exceeded a customer's required delivery time;
- an average number of days exceeding delivery time calculation section that calculates any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L has exceeded the customer's required delivery time;
- an inventory adjustment period correction section that corrects the inventory adjustment period N to the representative value LL or the value obtained by adding an ordering cycle M for the commodity to the representative value LL; and
- a safety stock amount calculation section that calculates the safety stock amount SS based on the standard deviation σ, corrected inventory adjustment period N, and safety coefficient k.

21. The safety stock amount calculation device according to claim 20, further comprising means for inputting the lead time L and ratio of service S and means for displaying the safety stock amount SS.

22. The safety stock amount calculation device according to claim 20, further comprising a reorder point calculation section that calculates a reorder point O by adding a value obtained by multiplying a demand average A and the representative value LL to the safety stock amount SS.

23. The safety stock amount calculation device according to claim 20, further comprising an order quantity calculation section that adds an amount of the commodity or its components to be used in the period obtained by adding the representative value LL and an ordering cycle M to the safety stock amount SS and subtracts, from the obtained value, a current stock amount and current order remaining amount to calculate an order quantity O'.

24. A non-transitory computer-readable recording medium storing a safety stock amount calculation program that allows, in order to calculate a safety stock amount SS, a computer to function as:
- means for calculating a commodity demand deviation σ related to demand for a certain commodity;
- means for calculating a probability Pb that a delivery time for the commodity required by a customer is shorter than the lead time L of the commodity or its components;
- means for calculating any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L has exceeded the customer's required delivery time;
- means for correcting an inventory adjustment period N to the representative value LL or the value obtained by adding an ordering cycle M for the commodity to the representative value LL; and
- means for calculating the safety stock amount SS based on the standard deviation σ, corrected inventory adjustment period N, probability Pb and a safety coefficient k that denotes the level of a ratio of service S for demand.

25. A non-transitory computer-readable recording medium storing a safety stock amount calculation program that allows, in order to calculate a safety stock amount SS, a computer to function as:
- means for calculating a commodity demand deviation σ related to demand for a certain commodity based on data to be obtained in the case where the lead time L of the commodity or its components has exceeded the customer's required delivery time;
- means for calculating any of an average value, median, mode, experimental value of the difference between the lead time L and the customer's required delivery time, and a value obtained by subtracting the minimum value of the customer's required delivery time from the maximum value of the lead time L as a representative value LL of the difference between the lead time L and the customer's required delivery time in the case where the lead time L has exceeded the customer's required delivery time;
- means for correcting an inventory adjustment period N to the representative value LL or the value obtained by adding an ordering cycle M for the commodity to the representative value LL; and
- means for calculating the safety stock amount SS based on the standard deviation σ, corrected inventory adjustment period N, and a safety coefficient k that denotes the level of a ratio of service S for demand.

* * * * *